United States Patent
Enzmann et al.

(10) Patent No.: US 6,615,735 B2
(45) Date of Patent: Sep. 9, 2003

(54) PYROTECHNIC GAS GENERATOR

(75) Inventors: Ernst Enzmann, Grassau (DE); Johann Vetter, Waldkraiburg (DE)

(73) Assignee: TRW Airbag Systems GmbH & Co. KG, Aschau Inn (DE)

(*) Notice: Subject to any disclaimer, the term of this patent is extended or adjusted under 35 U.S.C. 154(b) by 0 days.

(21) Appl. No.: 09/994,106

(22) Filed: Nov. 26, 2001

(65) Prior Publication Data

US 2002/0073872 A1 Jun. 20, 2002

(30) Foreign Application Priority Data

Nov. 27, 2000 (DE) .......................... 200 20 102

(51) Int. Cl.$^7$ .............................. C06D 5/06; B60R 21/28
(52) U.S. Cl. .................... 102/288; 102/289; 102/530; 280/741; 280/743.1
(58) Field of Search ................. 102/288, 289, 102/530; 280/741, 743.1

(56) References Cited

U.S. PATENT DOCUMENTS

| | | | |
|---|---|---|---|
| 4,402,269 A | 9/1983 | Smith | 102/202.13 |
| 4,656,948 A * | 4/1987 | Tsukiuda et al. | 102/289 X |
| 4,943,086 A | 7/1990 | Cunningham | 280/741 |
| 5,403,036 A | 4/1995 | Zakula et al. | 280/741 |
| 5,482,316 A * | 1/1996 | Lang et al. | 102/531 X |
| 5,527,067 A * | 6/1996 | Iwai et al. | 280/741 |
| 5,556,130 A * | 9/1996 | Fulmer | 102/530 |
| 5,585,597 A * | 12/1996 | Faigle et al. | 102/530 |
| 5,623,115 A * | 4/1997 | Lauritzen et al. | 102/288 |
| 5,844,164 A * | 12/1998 | Cabrera | 102/288 |
| 5,951,042 A * | 9/1999 | O'Loughlin et al. | 280/741 |

FOREIGN PATENT DOCUMENTS

| | | |
|---|---|---|
| DE | 3425836 A1 | 1/1986 |
| DE | 4307774 A1 | 9/1994 |
| DE | 4435319 A1 | 4/1996 |
| DE | 19601448 A1 | 7/1997 |
| DE | 69515774 T2 | 11/2000 |
| EP | 1043201 A2 | 10/2000 |
| WO | WO 9410528 | 5/1994 |

* cited by examiner

Primary Examiner—Peter A. Nelson
(74) Attorney, Agent, or Firm—Tarolli, Sundheim, Covell & Tummino L.L.P.

(57) ABSTRACT

The invention relates to a pyrotechnic gas generator comprising a gas-tight outer housing consisting of at least two parts, a first part of which being a receiving part for pyrotechnic material and a second part of which being a base part which is connected with the receiving part by welding so as to form the outer housing. One of both parts has a radially projecting, surrounding flange with an outer peripheral edge and the other part has an axially extending, rim-like projection circumferentially surrounding said peripheral edge and having an inner surface which is contacted by the peripheral edge. The welding of the first and second parts is provided at the flange.

10 Claims, 1 Drawing Sheet

PYROTECHNIC GAS GENERATOR

TECHNICAL FIELD

The invention relates to a pyrotechnic gas generator and a method of producing the gas generator.

BACKGROUND OF THE INVENTION

Known gas generators comprise a gas-tight outer housing consisting of at least two parts, a first part of which being a receiving part for pyrotechnic material and a second part of which being a base part which is connected with the receiving part by welding so as to form the outer housing. In gas generators hitherto, generally the outer housing is produced from a sheet metal body which is closed by the base part, likewise of sheet metal. When the receiving part has a radially surrounding, i.e. circumferentially closed, flange for connection to the base part and the flange is welded to the base part, this usually takes place by simultaneous application of a pressure onto the radial flange, in order to press the latter against the base part. During welding, the flange is deformed by the heating and pressed in the radial outward direction so that the peripheral edge, i.e. the radial outer edge surface, of the radial flange is not arranged so as to be exactly defined relative to the base and often projects radially beyond the base, so that the base together with the peripheral edge subsequently have to undergo a metal-cutting process on their outer sides.

U.S. Pat. No. 4,402,269 discloses a detonator with an outer and an inner housing. The cup-shaped inner housing has a radial protruding flange arranged between radial flanges of two parts defining the outer housing. The three flanges are welded together at their radially facing outer edge surface. The welding defines the outest portion of the detonator which has a geometry and dimension which can, due to the welding process, not be predicted very precisely. Further, as three flanges are to be welded together the quality of the welding is to be extremely high, in order to achieve moisture and gas tightness.

An example of a non-welded gas generator comprising a base part and a sheet metal housing part is disclosed in German Laid-Open Document 34 25 836. The cup-shaped housing part has a surrounding flange with which it is inserted in a groove in the base part. The two parts are firmly connected with each other in that a surrounding lip on the base part is crimped inwardly towards the cup-shaped part. The flange has the purpose of forming a counterpart for the crimped portion which serves both for axial and radial positioning of the two parts.

BRIEF SUMMARY OF THE INVENTION

The invention provides a pyrotechnic gas generator in which the subsequent working can be dispensed with and in which the peripheral edge of the flange has a defined, predeterminable position and dimension. This is achieved in a pyrotechnic gas generator which comprises a gas-tight outer housing consisting of at least two parts, a first part of which being a receiving part for pyrotechnic material and a second part of which being a base part which is connected with the receiving part by welding so as to close and to form the outer housing. One of the first and second parts has a radially projecting, surrounding, i.e. circumferentially closed, flange with an outer peripheral edge, i.e. an edge facing in the radial direction, and the other one of said first and second parts has an axially extending, rim-like projection circumferentially surrounding the peripheral edge and having a radial inner surface which is contacted by the peripheral edge. The welding of the first and second parts is provided at the flange at the axial surfaces lying on each other.

In the gas generator proposed, the flange can possibly be deformed slightly radially outwards during welding; however, it then abuts at the projection on the other part which delimits the deformation. Thus, a finishing step of the peripheral edge is no longer necessary, because the peripheral edge no longer protrudes radially with respect to the base. The new device can be used in large numbers reliably with regard to fail-safeness, and is suitable for a large-scale technical application. Also the reduction of test steps and hence costs is to be mentioned as an advantage.

Preferably the axial height of the projection corresponds to the axial thickness of the flange allowing the welding apparatus to easily reach and press the radial flange against the other part.

According to an embodiment, the outer housing completely consists of metal, e.g. by the receiving part being produced from aluminum. Furthermore, however, the invention can also be realized with an all plastic housing.

The welding takes place by capacitor discharge welding, a welding process in which usually the two parts are also pressed against each other during the application of the welding current, or ultrasonic welding.

As the receiving part is usually a thin-walled, cup-shaped, deformed part, it preferably has the radial flange which can be formed by simple deformation.

The gas generator according to the invention can be an igniter which is sealed hermetically to the exterior. The invention further relates to a gas generator in which the outer housing is provided to accommodate the propellant charge and the igniter. The igniter is positioned in the base part.

In the preferred embodiment, it is further considered that the propellant charge immediately adjoins the outer housing on the inner face.

The invention further relates to a method of producing the gas generator according to the invention.

DETAILED DESCRIPTION OF THE PREFERRED EMBODIMENT

Figure 1:
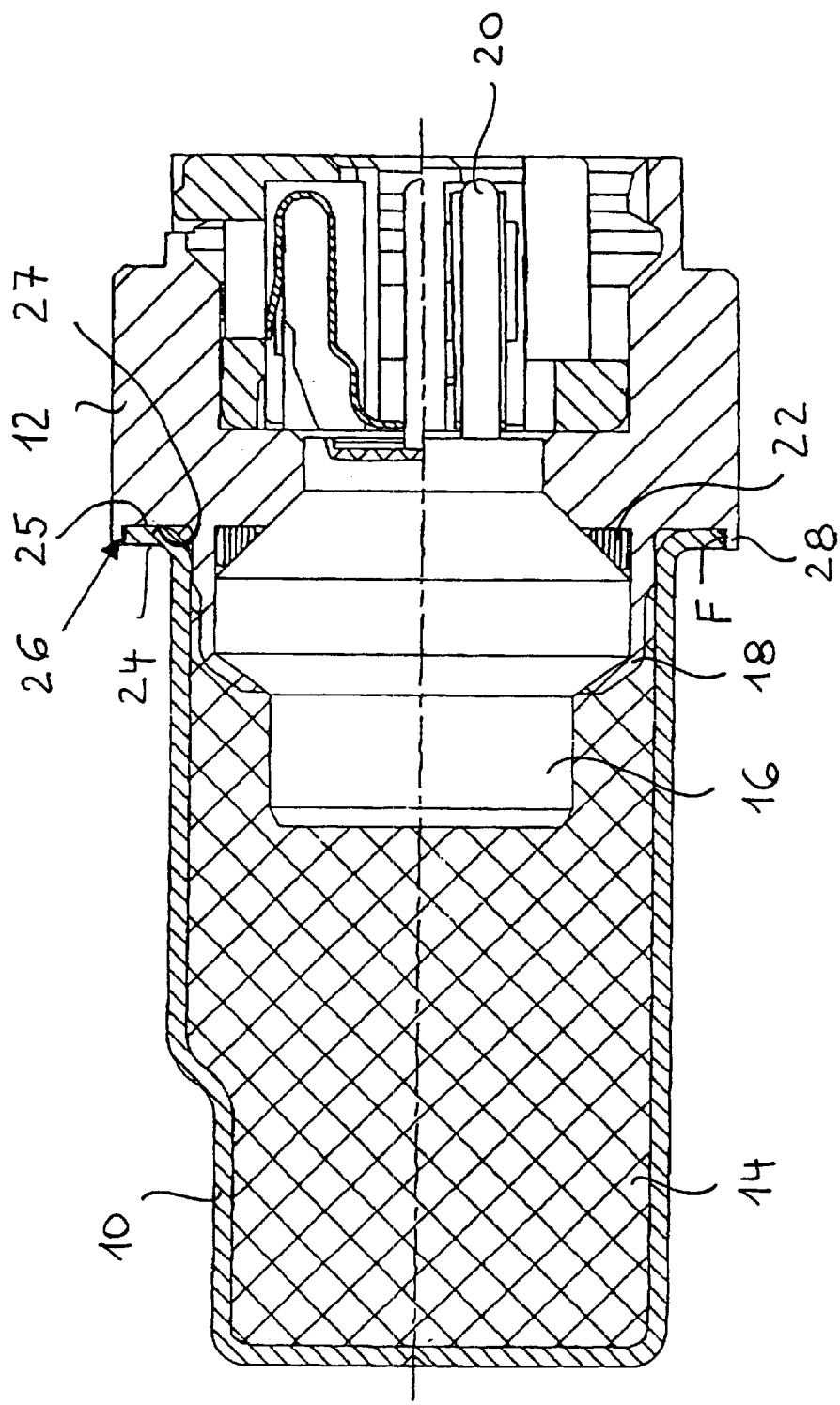
FIG. 1 shows a longitudinal section through an embodiment of the gas generator according to the invention.

The pyrotechnic gas generator shown in FIG. 1 is a gas generator for driving a belt tensioner. The gas generator has an outer housing, consisting of two parts, with a cup-shaped, thin-walled receiving part 10 (first part) deep-drawn from an aluminum sheet, and with a base part 12 (second part) of aluminum, closing the receiving part and hence the outer housing. The receiving part is firstly filled with a propellant charge 14 of pyrotechnic material, which immediately adjoins the outer housing on the inner face. An igniter 16 constructed as an encapsulated unit is also accommodated in the outer housing, which igniter 16 projects into the propellant charge 14 and is fastened to the base part 12 by the bending down of a surrounding projection 18. Two contact pins 20 project on the rear face from the igniter, which pins 20 are provided for connection to a control unit. An O-ring 22 between the base part 12 and the rear face of the igniter 16 serves to seal the interior of the outer housing from the entry of moisture and the outlet of gas on activation of the gas generator.

After filling the receiving part 10 with the propellant charge 14 the base part 12 is put onto it to close the housing.

As neither moisture is permitted to penetrate into the pyrotechnic propellant charge 14, nor gas to emerge at undesired sites on activation, the connection between the receiving part 10 and the base part 12 must be gas- and moisture-tight. At the connection between these two parts, the receiving part 10 has a surrounding flange 24 extending radially outwards, with an outer peripheral edge 26 which runs in the form of a circular ring and is closed. The flange 24 lies with its full axial surface 25 on an axial surface 27 of the base part 12. Radially outwardly of the peripheral edge 26 the base part 12 has a rim-like preferably even and circumferentially closed axial projection 28 protruding axially to the receiving part and completely surrounding the receiving part. The peripheral edge 26 lies against the radial inner surface F of the projection 28.

The axial height of the projection 28 corresponds to the axial thickness of the flange 24 in the manufactured state, in which the receiving part 10 and the base part 12 are welded to each other at the flange 24, more precisely at the axial surfaces 25, 27. The welding takes place by capacitor discharge welding or by ultrasonic welding. On welding of the two parts, these are pressed against each other in the region of the flange 24 and, in the axial direction, so that during the welding process and the heating of the material connected therewith in the region of the flange 24 a travelling of material of the flange 24 outwards is brought about. The material, however, then abuts at the projection 28 and does not protrude radially with respect to the base part 12 as the axial projection 28 limits the movement of the flange material.

The dimension of the flange 24 and of the projection 28 before the fastening of these two parts to each other can either be selected such that the peripheral edge 26 already lies against the projection 28 before the welding process or such that a defined gap is present before the welding process, which disappears during the welding process through the travelling of the material. In the latter case, the two parts are aligned to each other during the welding process in that the inner face of the receiving part 10 centers itself on the outer face of the projection 18, against which it lies.

Through the provision of the projection 28 and the fact that the peripheral edge 26 lies against the projection 28, furthermore a type of gap sealing is produced, which for an additional sealing effect also protects from corrosion.

What is claimed is:

1. A pyrotechnic gas generator comprising:
   a gas tight outer housing consisting of two parts,
   an integral first part of which being a cup-shaped receiving part defining an interior filled with propellant charge and having one axial opening, and
   a second part of which being a base part which is connected with said receiving part by welding and which closes said axial opening and said outer housing,
   said first part having an integral radially projecting, surrounding flange with a peripheral edge surface facing radially outwards,
   said second part having an axially extending projection circumferentially surrounding said peripheral edge surface, said projection further having an inner surface facing radially inwards,
   said inner surface being contacted by said peripheral edge surface, and
   said first and second parts being welded together at said flange.

2. The gas generator according to claim 1, wherein an axial height of said projection corresponds to an axial thickness of said flange.

3. The gas generator according to claim 1, wherein said outer housing is made of metal.

4. The gas generator according to claim 1, wherein said welding is one of a capacitor discharge welding and an ultrasonic welding.

5. The gas generator according to claim 1, wherein said propellant charge immediately adjoins said outer housing on an inner face thereof.

6. The gas generator according to claim 1, wherein said receiving part is a thin-walled, deformed cup-shaped sheet metal part made in one piece.

7. The pyrotechnic gas generator according to claim 1, wherein the gas generator is filterless.

8. The pyrotechnic gas generator according to claim 1, wherein an igniter is encapsulated into the second part and protrudes into said pyrotechnic material within said first part.

9. The pyrotechnic gas generator according to claim 1, wherein said first and second parts are welded together at an axial face of said flange and radially inwards from said peripheral edge surface.

10. A method for producing a pyrotechnic gas generator, the method comprising the steps of:
    providing a gas-tight outer housing consisting of at least two parts a first part of which being a receiving part and a second part of which being a base part, said first part having a cup-shape to define an interior having a radially protruding, surrounding flange with an outer peripheral edge surface facing radially outwards and having an axial opening, said second part having an axially extending projection circumferentially surrounding said peripheral edge surface and having an inner surface opposing said peripheral edge surface,
    filling said interior of said first part with a pyrotechnic propellant charge so that said propellant charge immediately contacts said first part,
    closing said first part by putting on said second part onto said first part so that an axial surface of said first part contacts and axial surface of said second part,
    welding said flange and said second part together and simultaneously pressing said first and second parts together in an axial direction so that flange material moves radially outwards to contact said inner surface.

* * * * *